(12) United States Patent  
Meehan

(10) Patent No.: US 6,556,818 B1
(45) Date of Patent: Apr. 29, 2003

(54) FIXED CALLING PARTY PAYS CHARGES

(75) Inventor: Kevin P. Meehan, Yardley, PA (US)

(73) Assignee: Bell Atlantic Mobile, Inc., Bedminster, NJ (US)

( * ) Notice: Subject to any disclaimer, the term of this patent is extended or adjusted under 35 U.S.C. 154(b) by 0 days.

(21) Appl. No.: 09/556,294

(22) Filed: Apr. 24, 2000

(51) Int. Cl.$^7$ ........................ H04M 11/00; H04M 15/00
(52) U.S. Cl. ........................ 455/406; 455/406; 455/407; 455/408; 455/445; 379/114.05; 379/114.21; 379/114.28; 379/59; 379/58; 379/60; 379/56
(58) Field of Search ................................. 455/405, 406, 455/407, 408, 445; 379/114.05, 114.21, 114.28, 59, 58–60, 57, 56

(56) References Cited

U.S. PATENT DOCUMENTS

| | | | |
|---|---|---|---|
| 4,233,473 A | 11/1980 | Frost | |
| 4,706,275 A | 11/1987 | Kamil | |
| 4,930,150 A | 5/1990 | Katz | |
| 5,220,593 A | * 6/1993 | Zicker et al. | 379/114.19 |
| 5,353,331 A | 10/1994 | Emery et al. | |
| 5,473,667 A | 12/1995 | Neustein | |
| 5,557,664 A | 9/1996 | Burns et al. | |
| 5,579,379 A | 11/1996 | D'Amico et al. | |
| 5,586,177 A | 12/1996 | Farris et al. | |
| 5,666,405 A | 9/1997 | Weber | |
| 6,058,300 A | 5/2000 | Hanson | |
| 6,078,805 A | 6/2000 | Scott | |
| 6,169,891 B1 | 1/2001 | Gorham et al. | |
| 6,198,915 B1 | 3/2001 | McGregor et al. | |
| 6,215,790 B1 | 4/2001 | Voit et al. | |
| 6,226,364 B1 | * 5/2001 | O'Neil | 379/112.01 |
| 6,259,782 B1 | 7/2001 | Gallant | |
| 6,263,056 B1 | 7/2001 | Gruchala et al. | |
| 6,266,523 B1 | 7/2001 | Cook et al. | |
| 6,282,274 B1 | 8/2001 | Jain et al. | |
| 6,301,474 B1 | 10/2001 | Hatmaier et al. | |
| 6,311,053 B1 | 10/2001 | Feit et al. | |
| 6,345,182 B1 | 2/2002 | Fabritius et al. | |
| 6,397,055 B1 | * 5/2002 | McHenry et al. | 379/114.05 |
| 6,405,028 B1 | 6/2002 | DePaola et al. | |
| 2001/0041553 A | * 2/1997 | Chang et al. | 455/406 |
| 2002/0058495 A | * 12/1998 | Chow et al. | 455/406 |

* cited by examiner

Primary Examiner—Vivian Chin
Assistant Examiner—K. Afshar
(74) Attorney, Agent, or Firm—McDermott, Will & Emery

(57) ABSTRACT

A service is provided in which a landline telephone user can subscribe, for a fixed set fee, to billing coverage for any and all calls placed to a mobile CPP destination from the subscriber line, regardless of call duration. The fee, preferably, may be added to the subscriber's monthly bill. In response to placement of a telephone call to a CPP subscriber station, a land line network data base is accessed to obtain a call processing record for the called station to determine whether that the called station subscribes to CPP service. If so, a call processing record for the calling station is accessed to determine whether the calling station subscribes to the fixed fee billing for CPP calls. If so, call processing proceeds through a system tandem that formulates an IAM signaling message to be transmitted to a mobile system MSC. The signaling message includes the originating telephone number in altered form so that the MSC can identify the call as not requiring air time rating, as neither party will be billed for the air time usage.

20 Claims, 4 Drawing Sheets

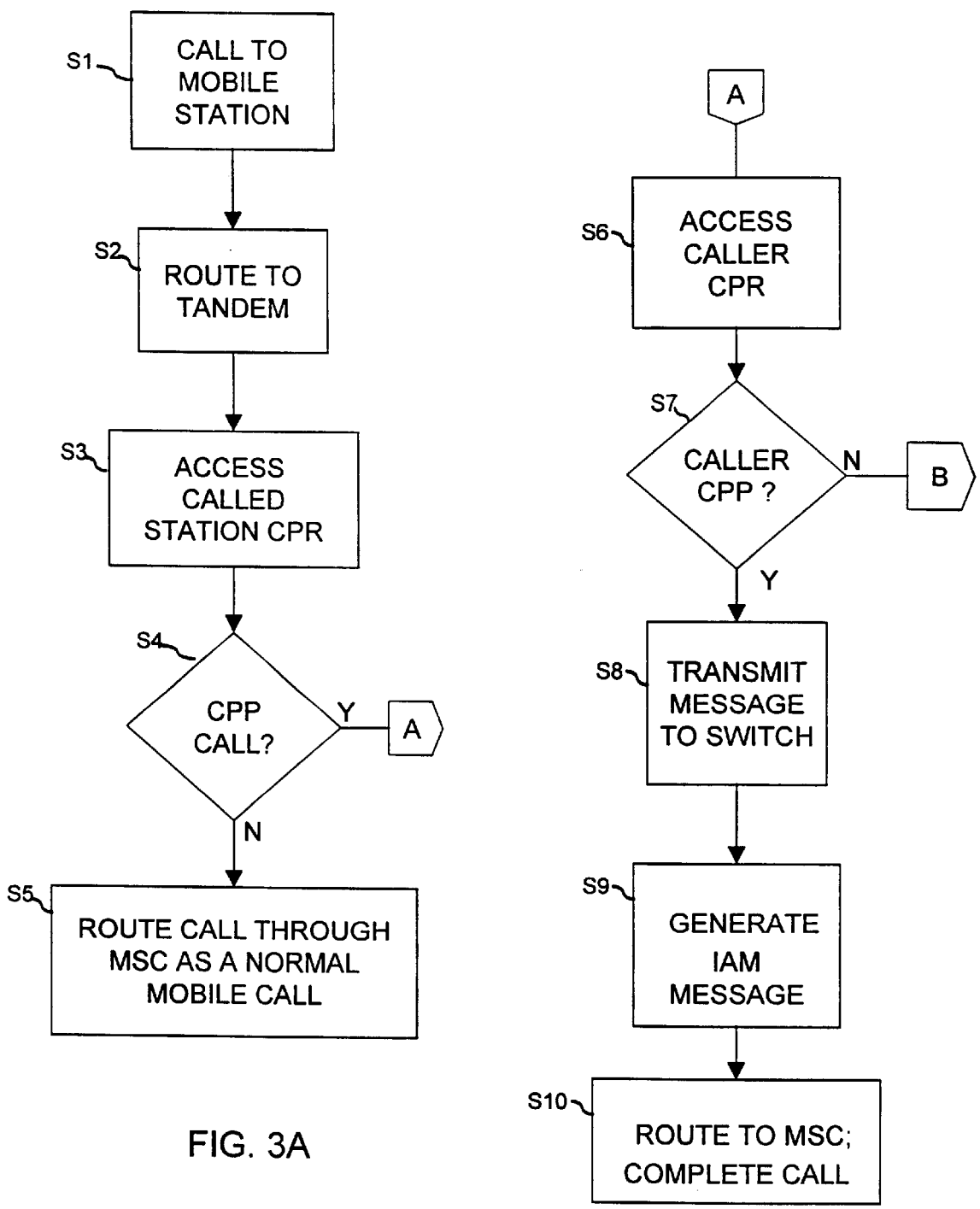

FIXED CALLING PARTY PAYS CHARGES

RELATED APPLICATIONS

This application contains subject matter that is related to subject matter disclosed in U.S. patent applications Ser. No. 09/456,550, filed Dec. 8, 1999, and Ser. No. 09/467,145, filed Dec. 20, 1999, assigned to the assignee of the present invention.

FIELD OF THE INVENTION

The present invention relates to an enhanced network architecture for providing Calling-Party-Pays (hereinafter CPP) billing services for customers of a wireless telephone network, such as cellular or personal communication service (PCS) customers. More particularly, the invention relates to provision of prepaid CPP services for landline customers.

BACKGROUND

Wireless telephone communication systems have evolved from the initially introduced Advanced Mobile Phone Service (AMPS) technology to more sophisticated digital-based air interface protocols. Digital access technologies have been developed based on Time Division Multiple Access (TDMA) or Code Division Multiple Access (CDMA) schemes. Although these digital access technologies have advantages with respect to analog-based systems, they have not yet been deployed in as many regions as AMPS-based systems. However, digital cellular subscribers in many areas presently are offered continuous coverage via dual-mode wireless telephones capable of switching between a digital mode (e.g., CDMA) and an analog mode (e.g., AMPS).

Ordinarily, charges for wireless services air-time charges are applied to the party subscribing to the wireless service. The wireless carrier bills, either directly or through the local exchange carrier, a monthly subscription fee plus per-minute fees for telephone communications over-the-air to and from each subscriber's telephone. A wireless subscriber is charged for the air-time, both on outgoing calls and on incoming calls directed to the subscriber's cellular or PCS telephone. In contrast, call charges for landline telephone service usually are billed to the subscriber associated with the calling station. Alternative landline billing arrangements are available for collect call billing or 800/888 type "toll-free" calling.

The costs for wireless air-time has tended to be high, compared to costs for traditional landline telephone services. In light of high costs and the fact that charges are incurred for air-time on incoming calls, many wireless subscribers have been reluctant to distribute widely their wireless telephone numbers. Such subscribers tend to utilize their wireless telephone for outgoing calls, as needed, but disclose their wireless telephone numbers to a limited number of friends or family from whom they are willing to pay to receive calls. Calls from relatively unknown parties, e.g. solicitors and nuisance sources, thereby are avoided.

To overcome these issues and to encourage increased wireless usage, the wireless industry has developed a modified billing arrangement, commonly referred to as "Calling Party Pays." The intent of the service generally is to shift the air-time charges for calls to wireless telephones from the wireless subscribers to the callers. The calling party would pay for all network charges, in a manner more like that used in the normal landline service billing. A number of techniques have been developed for processing and billing call charges on a CPP basis.

For example, U.S. Pat. No. 5,353,331 to Emery et al. discloses an intelligent network type integrated wireless and wireline system for processing calls to and from a Personal Communication Service (PCS) subscriber's wireless handset via a home base station or a public cellular network. The service logic in the integrated service control point (ISCP) facilitates a variety of service enhancements to the wireless PCS service. One of the disclosed service enhancements is CPP. When the intelligent network functionality detects a call to the PCS customer's number, the network accesses a call processing record for that customer. Based on that record, the network screens the call based on the caller's identity. If the caller is not a recognized party, the ISCP database causes the network to play an announcement asking the caller if he or she is willing to pay all charges for the call. If the PCS subscriber is currently registered via a public wireless network switching office, the announcement would ask if the caller is willing to pay for the air-time necessary to complete the call via a wireless link. If the caller accepts the charges, the ISCP provides messages to a landline switch and/or to a mobile switch to instruct them to complete the call and to add charges for the air-time to the calling party's telephone bill.

U.S. Pat. No. 5,579,379 to D'Amico et al. discloses an AIN-based PCS service similar to the Emery arrangement. D'Amico adds further details to the CPP operations of that network. When a call directed to a mobile subscriber is detected, the call processing is stopped to determine if the CPP feature is in operation. At the same time, the network collects data regarding the calling party for analysis. If the called subscriber is using the CPP feature, the ISCP analyzes the caller data to determine if the caller is on a list of those individuals not required by the particular mobile service subscriber to pay for cellular charges. If the calling party does not fall in this category, the network provides an announcement to the calling party, asking the calling party whether or not the calling party is willing to pay for air-time necessary to complete the call. If the caller indicates willingness to pay for the air-time, the AIN network functionality obtains correct billing information, and the network completes the call and computes the cellular charges.

In systems such as those of Emery et al. and D'Amico et al., a landline carrier typically operates the intelligent network and performs the routing services, for certain aspects of the follow-me functionality of the PCS service. The carrier operating that network also performs the billing services related to the CPP feature. If the caller is a subscriber of the landline carrier, that carrier adds the air-time charges to the subscriber's normal telephone bill. The landline network carrier, rather than the cellular carrier, bears the responsibility of billing the calling party.

U.S. Pat. No. 5,557,664 to Burns et al. discloses use of a central database to determine whether to bill a calling party or a called party for charges for completion of a call to a mobile telephone. The illustrated system includes switches of a local exchange carrier network, switches of an interexchange carrier (IXC) network, one or more mobile switching centers and a service processor with announcement facilities, service logic and a database. If a calling station dials a telephone number of a party who subscribes to the CPP service, the local exchange switches extend the call to the originating IXC switch. The originating IXC switch provides a message, containing the dialed telephone number, to the service processor. The service processor retrieves a record corresponding to the dialed telephone number, and causes the announcement platform to provide an announcement regarding the pricing of the call through the network to the calling party. If the caller responds to the announcement by staying on the line to indicate acceptance of the charges, the service processor instructs the originating IXC switch to record billing information and notifies the billing system to charge the caller's account. The service processor also provides the mobile identification number (MIN) for completion of the call, to the originating IXC switch. The IXC network includes an indicator, preferably in the form of the dialed number, together with the MIN in the signaling to the mobile switching center, as an indication to inhibit normal billing for the call.

U.S. Pat. No. 5,473,667 to Neustein discloses a paging network. The system utilizes an automated attendant, which prompts a caller for desired information, to make a page. As part of the control of a paging operation, a central processor checks the profile of the paged party in the profile data base. The profile data enables the system to provide a number of enhanced services to paging service subscribers. In one of the enhanced services a paging party pays for the service on a per call basis. With the disclosed CPP type paging service, the caller calls the nearest central station and dials in the number of the pager he desires to page. The caller then enters his own billing number, for example his own telephone number or calling card number. If the billing number is valid, the system accepts an alphanumeric message or voice message from the caller and initiates paging of the called party's paging apparatus.

While all of the systems described above provide some level of effectiveness in billing for air-time to the calling party, each has certain practical limitations in actual use. A need still exists for systems and methodologies that enable one or more carriers to provide CPP wireless services, with little or no leakage, i.e. no class of calls that the carriers can not efficiently bill to the calling party. The above-identified copending application, Ser. No. 09/456,550, and incorporated herein by reference, addresses these needs by providing a network architecture and call processing logic, which enable CPP billing for calls to wireless subscribers including incoming calls that would otherwise leak through the billing operations of the principle carriers. A landline network routes incoming calls for a CPP subscriber to the wireless carrier's network. The landline network recognizes each call that is subject to CPP billing. If the carrier operating the landline network can bill a party associated with the calling station, that network routes the call to the mobile carrier's network and creates records for billing for the air-time. However, if the landline network can not bill a particular calling party, the landline network hands the call off to another switch. This switch provides access to one or more alternate billing facilities. The alternate billing facilities preferably include a clearinghouse and a credit card billing system. A database indicates whether it is possible to bill for the air-time through the clearinghouse. If so, the switch completes the call to the mobile carrier's network and creates appropriate records to enable the clearinghouse to bill the air-time to the party associated with the calling station. If the caller is not billable through the clearinghouse, the switch extends the call to the automated credit card billing system. The credit card system makes all necessary records to bill the air-time charges for the call and bills the time against the caller's credit card account.

A need remains in the above described implementations to provide the mobile system, in an efficient manner from a call processing perspective, the capability of handling calls to CPP subscriber stations from sources that are exempt from CPP application. At least two options had been contemplated for providing CPP exempt status for callers. In a first alternative, the CPP mobile subscriber may establish a PIN to be used by any caller to avoid being responsible for the called party subscriber's air time charges. Those persons for whom the subscriber is willing to pay for incoming calls can be given the PIN by the subscriber. Upon placement of a call to the subscriber, the caller is given the opportunity to enter the PIN. If a valid PIN is entered, CPP exempt status is established. The system must change the accounting and billing process from charging the calling party for air time to charging the called party. In a second alternative, the CPP subscriber may formulate a "VIP" list of telephone numbers from which calls will be exempt from the CPP status. The list is stored in a landline system data base that is accessed upon placement of calls to the subscriber. A match of the calling telephone number with a number in the list thus will initiate a change in the accounting and billing process to charge the called party, rather than the calling party, for the called party's air time usage. Both alternatives may be implemented concurrently or individually.

Once a PIN has been verified or a calling number has been found to match a VIP listing, the use of a landline system for supervising CPP treatment is no longer necessary. Landline resources and trunks should not needlessly be tied up thereafter. A technique still is needed to transition efficiently to conventional treatment of calls to mobile users. The above-identified copending application Ser. No. 09/467,145 recognizes and addresses this need. An additional need was recognized therein to provide a CPP subscriber the capability to know that an incoming call is an exception to the CPP service. Such capability would give the subscriber an option of not answering if it is not desirable to incur charges at that time. The subscriber could then feel more comfortable in expanding the base of individuals to whom the PIN will be divulged or who will be added to the VIP listing. Mobile phones conventionally have the capability to display menu information, messages and caller ID information. Display of CPP exempt status of an incoming call would relieve the subscriber from otherwise having to remember whether a call from a particular individual is a CPP exempt call. Mindful of the exempt status, the subscriber can be alert to limit the time of engagement of the call.

The above mentioned patents and copending applications alleviate problems relating to application of air time charges, either for a mobile customer who would receive chargeable unwanted calls or for a calling party who otherwise would be responsible for CPP calls. The establishment of CPP exempt status for any particular caller having the above described alternative options essentially is under the control of each CPP subscriber to whom the caller places a call. From the perspective of a landline subscriber who would place a local call to a CPP destination, these approaches to billing are unlike conventional treatment of landline calls.

The landline subscriber normally is charged a fixed monthly fee for which he or she is entitled to either an unlimited number of calls to local numbers or to a prescribed number of such calls. Landline subscribers normally are not requested in any given call to be responsible for payment of excess charges, such as CPP charges, for a call to a local destination. Landline subscribers normally do not have to keep track of PIN numbers for one or more called numbers and engage in an interactive session with an intermediary in order to avoid charges for a local call. Landline subscribers normally do not have to restrict placement of VIP listed calls to the subscriber station in order to avoid excess charges for local calls. Yet in the arrangements described above, these complexities would be imposed on landline subscriber callers by options exercised earlier by one or more called parties. The need exists for providing a caller the ability of avoiding such impositions.

Thus, a further need exists for a service in which a landline subscriber can be relieved of responsibility for payment of CPP charges on a per call basis. It would be desirable for a landline subscriber to have the set monthly local telephone service charge include not only calls to certain CPP subscribers, but to all CPP destinations. Such a provision would be at the landline subscriber's option, would make CPP exempt status transparent to the caller with each call, and would eliminate variable application of charges based on air time usage. The CPP called party would also benefit by being relieved of charges for calls from VIP or PIN authorized callers.

The need for modification of the billing system for CPP calls to an arrangement consonant with conventional landline local subscriber billing would entail adjustment of the normal set monthly fee, as such added service would not necessarily be needed by other landline subscribers. Implementation of such service raises complexities due to additional requirements in call processing to distinguish calls from subscribers of such service from normal CPP calls and calls subject to CPP exemption through VIP or PIN status.

SUMMARY OF THE INVENTION

The present invention fulfills the aforementioned needs, at least in part, by interfacing a designated landline switching facility with a wireless mobile network mobile switching center to provide appropriate interactive signaling therebetween for CPP call processing. In response to initiation of a telephone call by a landline subscriber station, the call is routed to the designated landline switching facility, which may be a tandem switch. The switch then accesses a landline database, such as the signal control point (SCP) database in the PSTN AIN network and/or the PSTN line identification base (LIDB), to obtain a call processing record (CPR) for the called wireless unit to determine whether the mobile called party subscribes to calling party pays service. If the called party is a CPP subscriber, a CPR for the calling party is accessed in the SCP database or equivalent to determine whether the calling party subscribes to service billing coverage for outgoing CPP calls. It is envisioned that such service would apply a fixed charge to the normal telephone bill of the landline subscriber, such as the monthly bill, to cover an unlimited number of calls placed by the subscriber to CPP destinations.

If the calling party subscribes to CPP billing coverage, the call is routed to the MSC. The designated landline switch generates a data signaling message, preferably the signaling system IAM message, but with the telephone number of the calling station included in altered form. The call is then completed to the called wireless unit without accounting for air time charges. Detection of the altered form of the telephone number by the MSC alerts the MSC that the call, although directed to a CPP destination, is not to be treated for CPP billing of the air time charges for the called party to the calling party and that no rating of air time is to be conducted. As the IAM calling number field conventionally allocates twenty digits, of which ten digits normally are populated, an excess digit in this field can be used for this purpose. Thus, the altered form of the telephone number would be indicated by the use of eleven or more digits or the field.

The specific alteration of the calling telephone number is distinguishable from the calling telephone number alteration that is applicable to other exceptions to CPP status, such as described in the aforementioned copending application Ser. No. 09/467,145. For example, if an eleventh digit in the telephone number field is used as an identifier of PIN or VIP exempt status, the same digit can be used to indicate caller CPP billing coverage if each option is related to a different number for the digit. As an alternative, two extra digits can be used for one of the options while one extra digit can be used for the other option. Yet another treatment would be to assign a fictitious area code alphanumeric string to one of the options and a different alphanumeric string to the other option while using only ten digits. The actual area code of the calling station would be replaced in the number field with the fictitious code identifier. In all treatments, it is preferable that the seven digit calling telephone number remain intact so that it can be transmitted to the called party for display as caller ID information. If the called station is located in a "visiting" MSC area or if the MSC interface to the landline network is not the home MSC for the called party, the altered calling number field need be transmitted from the interface MSC to the visiting MSC (or home MSC) if the latter is normally responsible for tracking air time usage for the called party. The altered calling number would be recognized as an indication not to undertake air time accounting functions for the call.

If the calling party CPR lookup for a call identifies CPP bill service coverage, the system need not perform further processing steps relating to determination of VIP status or PIN identification, or thereafter obtain authorization for caller payment. With the caller CPP billing coverage service, charges for all calls placed to CPP destinations during the relevant time period preferably would be billed a flat one time charge regardless of the number of calls placed or duration of the calls. Thus the system need not track air time for the called party or account for such usage, thereby further conserving system resources. If the calling party CPR lookup does not find CPP bill service coverage, processing can continue as disclosed in the above described copending applications.

Additional advantages of the present invention will become readily apparent to those skilled in this art from the following detailed description, wherein the preferred embodiments of the invention are shown and described, simply by way of illustration of the best mode contemplated of carrying out the invention. As will be realized, the invention is capable of other and different embodiments, and its several details are capable of modifications in various obvious respects, all without departing from the invention. Accordingly, the drawings and description are to be regarded as illustrative in nature, and not as restrictive.

BRIEF DESCRIPTION OF DRAWINGS

The drawing figures depict the present invention by way of example, not by way of limitations. In the figures, like reference numerals refer to the same or similar elements.

FIGS. 3A–3C comprise a simplified flow chart illustrating the processing of a call placed to a mobile unit destination in accordance with the present invention

DETAILED DESCRIPTION OF THE PREFERRED EMBODIMENTS

Figure 1:
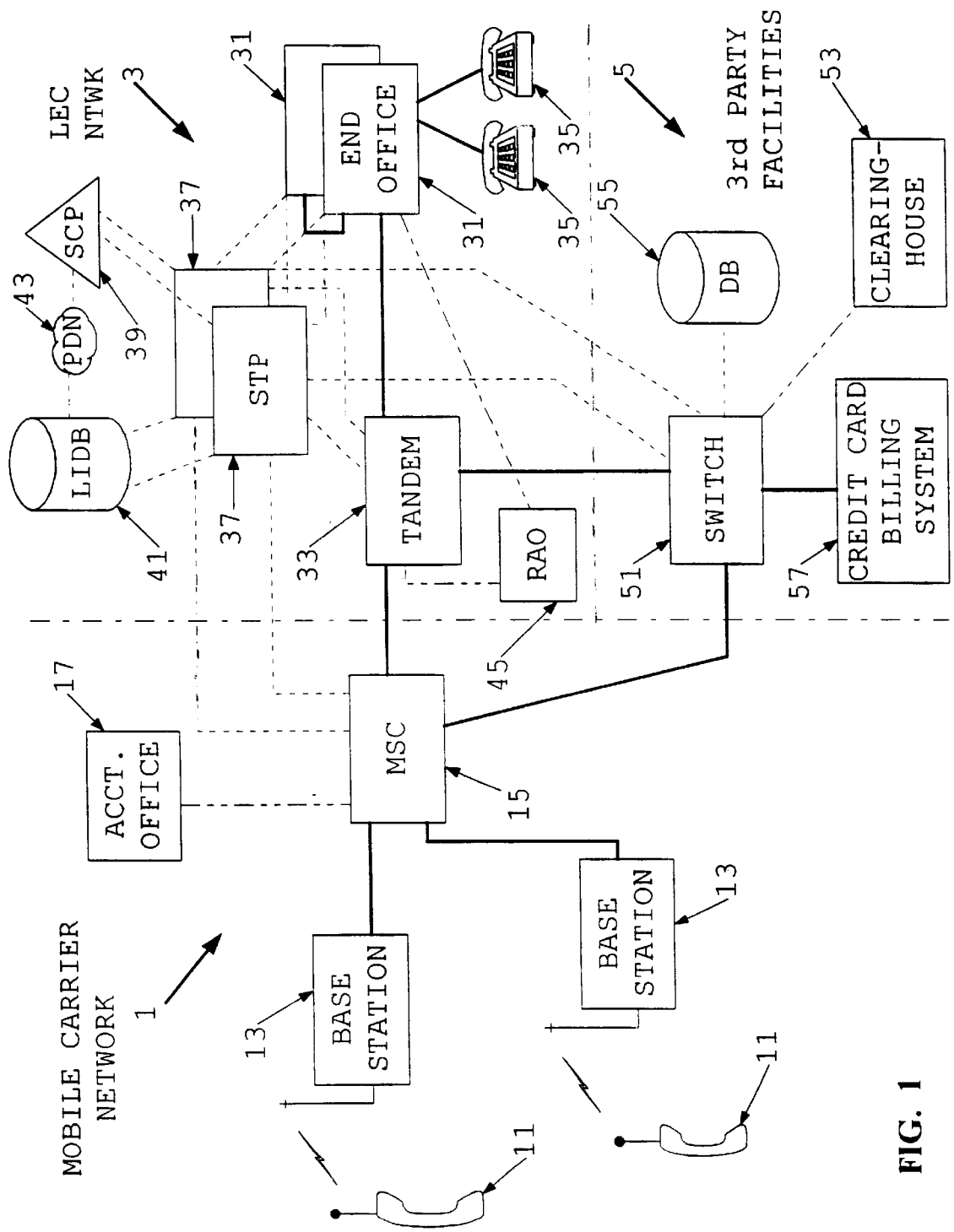
FIG. 1 is a simplified block diagram of a telecommunication system in accordance with the present invention.

The present invention utilizes features and functionalities in a wireless telephone network in conjunction with, at least in part, system architecture and call processing logic described in the previously identified copending applications, Ser. Nos. 09/456,550 and 09/467,145, the disclosures of which have been entirely incorporated herein. FIG. 1 is a block diagram related to that system architecture and described below in relation to the present invention.

For simplicity of illustration, the wireless carrier network 1 is shown as comprising a pair of base stations 13, connected to a mobile switching center (MSC) 15 that is interfaced and interconnected with landline networks. The wireless telephone network 1 preferably has the capability of providing analog, digital, or dual-mode network services. Wireless base stations 13 typically provide cellular or PCS radio coverage over the geographic area serviced by the network 1. Communication between mobile subscriber terminals, or handsets, 11 at different base stations can be completed through the wireless network path between base stations and MSC 15. The base stations 13 send and receive radio signals communicated to and from the compatible mobile stations 11. The base stations 13 also communicate over trunk circuits to a mobile switching center (MSC) 15. The MSC 15 controls the operations of the network 1 and provides selective switched connections. The illustrative drawing is representative of a wireless communication system that can provide service to a great number of subscribers 11, through a plurality of bases stations 13 and MSCs 15.

As part of normal operations, MSC 15 accumulates detailed call processing data for calls completed through the wireless network. The data for a completed call, for example, will include an identification of the mobile subscriber, the called or calling party telephone number for the other party to the call, the time of the call and the duration of the call. MSC 15 supplies this data to accounting office 17, preferably through an appropriate data communication link. A billing computer operating in the accounting office 17 can process call records from various MSCs in the wireless Network, to generate bills or invoices for delivery to the customers subscribing to the wireless carrier's services. The switched connections through the MSC 15 also provide selected call connections to the PSTN, for example to allow a user of mobile handset 11 to make a call to or receive a call from a landline telephone station.

Portions of a local exchange carrier network (LEC) 3 of the PSTN with which MSC closely interacts are represented in FIG. 1. The LEC telephone network includes a switched traffic network and a common channel signaling network that carries control signaling messages for the switched telephone traffic network. The telephone traffic network includes a number of end office type central office switching systems 31 and one or more tandem office type central office switching systems 33. Subscriber stations, depicted as telephones 35, are connected to the end office switches 31. Each end office type central office switch 31 provides switched telephone connections to and from local communication lines or other subscriber links coupled to end users stations or telephone sets 35. In the preferred implementation, the connections to the end offices 31 utilize telephone lines, and the switches 31, 33 are telephone type switches for providing landline communication. Of course, other communication links and other types of switches could be used, and the landline network 3 may be provisioned by a carrier other than the local exchange carrier.

Trunk circuits carry communication traffic between the end offices 31 and between the end offices 31 and the tandem switch 33. At least one tandem also provides trunk connections between the LEC network 3 and other carriers' networks. At least one trunk is linked between tandem 33 and MSC 15 of the mobile or wireless carrier's network 1. From the perspective of the network 3, all calls to or from the mobile stations go through tandem 33. Although not illustrated, tandem 33 may also provide connection to one or more interexchange carrier (IXC) networks.

The common channel interoffice signaling (CCIS) network portion of LEC 3 includes packet data links, illustrated as dotted lines, connected between appropriately equipped central office switching systems such as offices 31, 33 and a plurality of packet switches, termed Signaling Transfer Points (STPs) 37. To provide redundancy and thus a high degree of reliability, the STPs 37 typically are implemented as mated pairs of STPs. The CCIS network of the telephone system operates under an accepted signaling protocol standard, preferably Signaling System 7 (SS7). Each central office 31 or 33 has at least minimal SS7 signaling capability, which is conventionally referred to as a signaling point (SP) in reference to the SS7 network. The offices can exchange messages relating to call set-up and tear-down, typically in the format defined by the ISDN User Part (ISDN-UP) of SS7. At least some, and preferably all, of the central office switches 11 are programmed to recognize identified events or points in call (PICs) as advanced intelligent network (AIN) type service triggers. In response to a PIC or trigger, a central office 31 or 33 initiates a query through the CCIS signaling network to a control node or a database system, for instructions or information relating to AIN type services. Central office switching systems having full AIN trigger and query capability are referred to as Service Switching Points (SSPs). For purposes of the CPP service, at least the tandem 33 has full SSP capability. MSC 15 of the wireless carrier network 1 has signaling capability and connects by SS7 signaling links to the STP pair 37 of the LEC network 3. Although not shown, the MSC 15 link can include an IXC STP path.

The databases or other control nodes of the AIN used in networks such as the LEC network 3 include a number of different types of systems facilitating an increasingly sophisticated range of new services. One example of a control node is the Service Control Point (SCP) 39. Another common example of such an AIN database system is a Line Identification Data Base (LIDB) 41. Reference is again made to the earlier identified copending applications for a more detailed description of the SCP 39. SCP 39 and LIDB 41 may communicate with each other through private data network (PDN) 43. PDN 43 may be a packet switched data network, such as the TCP/IP network.

The LIDB database 41 is a general-purpose computer system having a signaling link interface or connection to a pair of STPs 37. The LIDB computer system runs a database program to maintain a database of information relating to customer accounts and identifications. For example, a subscriber's entry in the LIDB database might include the subscriber's telephone number, a personal identification number for credit card billing purposes, and the subscriber's name and address. The LEC LIDB 41 may contain one such record for each of the LEC subscribers with a defined service area. The LIDB 41 also contains a record for each wireless subscriber who subscribes to the CPP service. The record for each such wireless subscriber may be accessed by means of the wireless subscriber's mobile telephone number.

In a normal call in the LEC network 3, an end office type switch 31 will detect an off-hook condition on the line and provide dial tone. The switch 31 identifies the line by its office equipment (OE) number and retrieves profile information corresponding to the OE number and off-hook line. If needed, the profile identifies the currently assigned telephone number. The switch in the end office 31 receives dialed digits and routes the call. The switch may route the call to another line serviced by that switch, or the switch may route the call over trunks and possibly through one or more tandem offices 33 to an office 31 that serves the called party's station or line.

AIN call processing involves a query and response procedure between an SSP capable switching office and a control node or a database system, such as the SCP 39 or the LIDB 41. An SSP capable switching office will initiate AIN involvement upon recognizing a triggering event at a PIC during call processing. The triggering event effects a query to the appropriate node 39 or 41 to obtain a return instruction to the switching system for continuing call processing. A variety of types of triggers are available. The SCP 39 provides instructions relating to AIN type services. The LIDB 41 typically provides subscriber account related information, for calling card billing services or for subscriber name display purposes in an enhanced caller ID application.

In a call placed to a telephone number of a wireless or mobile station 11 from a landline terminal 35 of LEC network 1, the serving end office 31 recognizes the NPA-NXX digits in the dialed number as those of a carrier served through the tandem 33. The end office 31 responds by routing the call to the tandem 33. In normal call processing, the tandem would route the call to the MSC 15 for completion to the destination station 11 without intervention by AIN triggering. If the called party is a CPP subscriber, however, AIN call processing, preferably triggered in the tandem 33, is relied upon for processing the call. The presence of an account record for a subscriber of the mobile carrier in the LIDB 41 serves as an indication that a particular subscriber telephone number of the wireless carrier has an associated subscription to the CPP service. The AIN call processing logic within the SCP 39 then makes several determinations, which are used to decide how to proceed. For example, the SCP logic recognizes if the particular caller agrees to pay the charges and whether or not the LEC can bill the calling party. If appropriate, the SCP logic also may determine whether or not an exception applies to the CPP billing treatment for the specific call.

In normal operation, a switch examines a customer's service request, typically the destination telephone number and, based on customer profile or service information, determines if there is a need for AMA recording for the call, for example if the call is a long-distance call. If the call involves signaling communication with an SCP, an instruction from the SCP can override the normal decision process regarding AMA recording. For CPP calls, the SCP 39 can instruct the tandem switch 33 to make AMA records to enable billing calling LEC customers for air-time charges of the called party. AMA records are transported to a regional accounting office (RAO) 45. While such records may be stored on data tapes that are physically transported, switches preferably are provided with an appropriate data transfer link to allow electronic communication of the records to the RAO 45. The generation and accumulation of AMA record details and the various components of the RAO are generally well known.

To provide for rating and billing of calls that would otherwise "leak" through the CPP operations of the networks 1 and 3, the system of FIG. 1 also utilizes certain additional facilities that may be provided by one or more third parties, collectively identified by the network portion 5. The third party billing entity network provides access to at least two billing alternatives for CPP calls that can not be billed by the LEC. In one alternative, billing functions are handled through a clearinghouse for non LEC subscriber callers who have pre-established relationships with the clearinghouse. The other alternative provides automated credit card processing, wherein interactive communication is conducted to obtain from the caller identity of a credit card account and authorization to bill thereto air-time charges for the called party. The functions of these alternatives and the elements of the third party billing network may be under complete or partial control of the clearinghouse.

Switch 51 of the third party network is generally similar in structure and operation to the switches of the LEC network 3. The switch 51 has normal telephone switching capabilities. The switch 51 may also have rating and data recording capabilities, which might be provided for example by AMA recording equipment in a telephone switching office. The switch 51 provides AMA records of certain CPP calls to a clearinghouse 53, for bill processing. Switch 51 connects through trunk circuits to both the LEC tandem 33 and the MSC 15. The switch 51 also communicates call set-up signaling with both the LEC tandem 33 and the MSC 15. The signaling may be in-band, but preferably uses SS7 communications, for example, through one or more STPs 37 of the LEC and/or another CCIS service provider (not shown).

The third party facilities 5 also include a database (DB) 55, which may be similar to the LIDB, but maintained by the third party. The database DB identifies all customers that the third party can bill through the clearinghouse 53. The switch 51 and database DB 55 may be implemented by a central office switching system and an intelligent network database system communicating via SS7, similar to the systems of the LEC, for example if the third party service provider is another carrier offering its own variety of telecommunication services. Alternatively, the third party may provide only the switch and database together with data communications to the clearinghouse. In such a case the third party may use other implementations of the switch 51 and database DB 55, such as an integrated unit with both telephone switching and database look-up capabilities.

In a CPP call, when the LEC tandem 33 routes the call to the switch 51, the systems of LEC network 3 already have determined that the calling party has agreed to pay the air-time charges but the LEC can not bill the particular subscriber associated with the calling station. The switch 51 executes a routine to access the database 55 to determine if the third party can bill the calling station subscriber via the clearinghouse. If so, the switch 51 completes the call through the MSC. At this time, the switch makes the AMA records for later delivery to the clearinghouse system 53 and provides the signaling to the MSC 15 to suppress its normal data reporting regarding billing.

If the call can not be billed through the clearinghouse, automated credit card billing system 57 is invoked. The switch 51 provides selective call connections, for voice grade communications with callers, to the credit card billing system 57. The system 57 is a standard system for providing voice prompts to callers and collecting dialed digit or spoken information, for example, to obtain a credit card number from a caller. The system may also obtain expiration date and a PIN relating to the caller's credit card account. The system 57 communicates with existing credit card company equipment to verify account status and apply accrued charges to identified credit card accounts. The system 57 also includes telephone call rating equipment, to time telephone calls processed through the system 57 and calculate costs for such calls, including the billable air-time charges.

The system 57 remains in the call connection in order to time rate the call. The switch 51 does not make AMA records, but signals the MSC 15 to suppress its normal data reporting regarding billing. The billing system 57 accumulates the necessary records regarding the call and charges appropriate fees to the caller's credit card account.

Calls placed to a telephone number of a wireless or mobile station from a calling wireless station in a mobile system conventionally are handled internally. That is, call routing remains within the system, apart from the LEC PSTN. This conventional routing process, as previously discussed, does not satisfactorily provide for a CPP call from a mobile caller to a mobile called party. The architecture of FIG. 1 can overcome this deficiency. The wireless network does not require redundant duplication of landline facilities. Instead, the landline network, illustrated in FIG. 1, is accessed through recognition in the wireless network that a mobile call is being placed to a CPP mobile subscriber.

Figure 2:
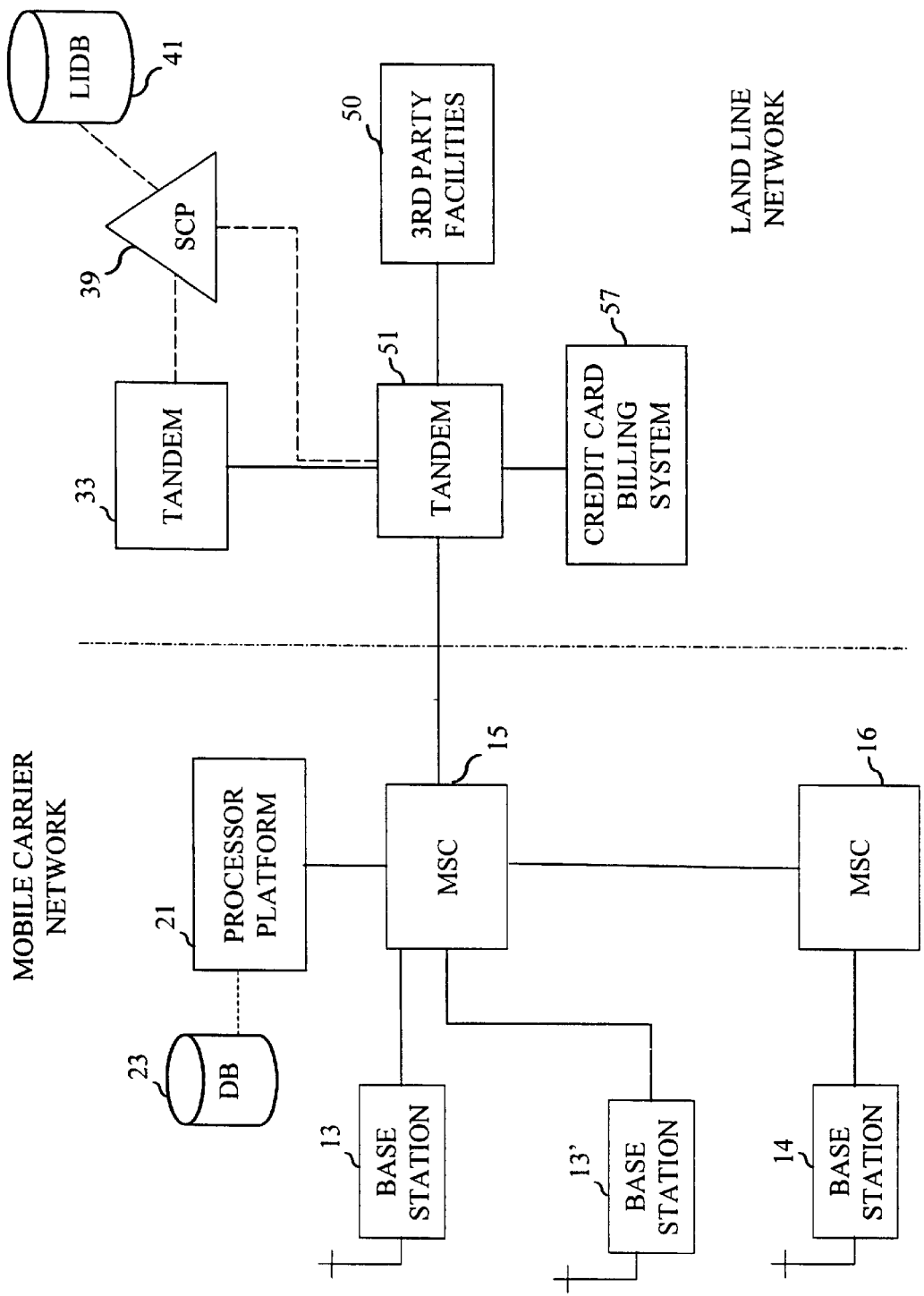
FIG. 2 is a partial block diagram of landline network and mobile network architecture in accordance with the present invention.

FIG. 2 is a partial block diagram of landline network and mobile network architecture that can provide for implementation of CPP service for calls originating from prepaid mobile users and for calls in which a mobile user may be in an area served by a "visiting" mobile switching center. Elements that are common with FIG. 1 are labeled with the same reference numerals. The mobile carrier network is represented as an expanded coverage area, respective portions of which are serviced by MSCs 15 and 16. The interconnection between these MSCs is represented by a direct trunk connection, although the two switching centers in practice can be linked by any combination of wire and/or wireless connections. The switching centers have signaling communication capability with each other and the landline network. Base stations 13 and 13' are each connected to, and served by, MSC 15. Similarly, MSC 16 is connected to and serves the wireless transmission area of base station 14. Any of these base stations is capable of completing a wireless link with a compatible mobile set that may be a "home" station or "visiting" station. Thus, with respect to a mobile unit in communication with base station 14, an MSC may be considered to be serving as a home or visiting switching center.

Processor platform (node) 21 is connected by a trunk group to mobile switching unit 15. Database 23, which serves node 21, is connected thereto by a data communication path. Database 23 contains records for all registered prepaid customers. The records store credit available and air-time rates. Processor platform 21 and database 23 may serve MSC 16 and other mobile switching centers that are not illustrated. Reference is made to copending application Ser. No. 09/467,144, filed Dec. 20, 1999, for a more detailed discussion of CPP service implementation for prepaid mobile calls.

MSC 15 is shown connected by at least one trunk to tandem 51 of the landline network. It is to be understood that this representation is merely illustrative, as in practice any one or more mobile switching centers may be so connected to a landline tandem. Tandem 51 is shown generally as a landline network tandem and may be part of the local carrier network or part of a different landline network interconnected therewith. Only by way of example, FIG. 1 illustrates the LEC tandem 33 connected to MSC 15 and an additional connection between MSC 15 and third party switch 51. For ease of illustration, the third party facilities are represented by block 50 and the tandem 51 corresponds to tandem 33 of FIG. 1. It is to be understood that additional detailed network architecture, including the signaling arrangement such as shown in FIG. 1, is provided but not illustrated as it is not necessary for understanding of the present invention.

Figure 3C:
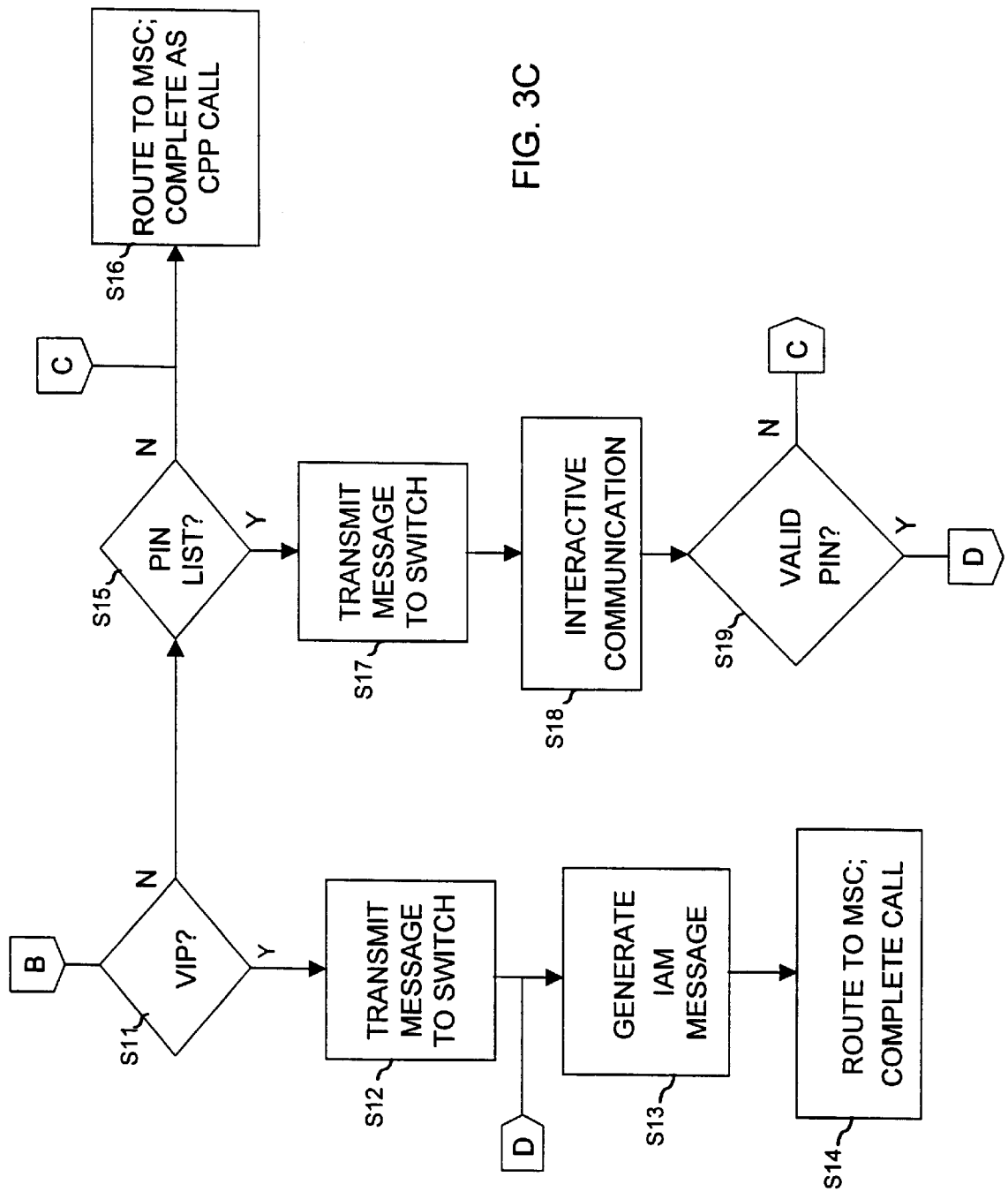

FIGS. 3A–3C comprise a simplified flow chart illustrating the processing of a call placed to a mobile unit destination in accordance with the present invention. At step S1 a call is initiated when a caller, for example, at landline station 35 in FIG. 1, takes the station handset off-hook and dials the mobile station telephone number which, for example, may be for a mobile unit located in the area of a base station connected to MSC 15 or 16. The end office 31, serving the calling station, routes the call to the tandem 51 at S2. As part of this routing, the end office signals the tandem 51. The ISDN-UP call set-up signaling to the tandem includes a variety of information, such as the calling party telephone number and the dialed destination number.

The tandem switch recognizes that the call is one intended for a mobile unit 11, for example from the NPA-NXX digits of the dialed number, and that a trigger has been set. A Transaction Capabilities Applications Part (TCAP) query message is then launched through one or more of the STP(s) 37 to the relevant LIDB and SCP databases at step S3. A call processing record (or equivalent record), stored in the database, is retrieved for the called party. At step S4, a decision is made from the retrieved called party information as to whether the call has been placed to a CPP service subscriber. If the destination station is not identified as a CPP service subscriber, the call is routed to the MSC for completion of the call in the normal manner for mobile destination calls at step S5. Conventional treatment of such calls involves routing the call to an MSC serving the area in which the mobile set is located, whether the home or visiting MSC, completing the routing path through a base station with calling party information supplied for display on the mobile set, and creating and maintaining charge accounting for billing if the call is answered.

If it has been determined in decision block step S4 that the call destination is a CPP subscribing station, the caller's CPR is accessed from the relevant database at step S6. From the information contained therein, it is determined at step S7 whether the calling station is identified as subscribing to CPP billing coverage. Such information may be stored in the LIDB as well as, or in lieu of, the SCP or peripheral database. If the calling station is identified as a CPP billing subscriber, the SCP (or LIDB) then formulates a TCAP call control type response message or equivalent, including the appropriate instructions for handling the call processing, and returns that response message to the tandem office via the SS7 network, at step S8. At step S9, the tandem switch, in response to the received instructions, will generate an IAM signaling message in order to complete routing of the call to the mobile unit destination without billing air time charges to either party. The calling party number field of the IAM message will include an altered version of the calling party telephone number, while retaining the final seven digits necessary for identifying the calling party subscriber. The alteration of the calling number preferably may be implemented by either changing the area code (first three digits of the ten digit calling party telephone number) or inserting one or more additional digits. As the IAM message format conventionally allocates twenty digits to the calling number field, particular digit locations can be pre-established for this purpose. Similarly, an area code descriptor that is not in actual use can be established as an identifier of CPP exempt status.

At step S10 the call is routed, with the generated IAM signaling message from the tandem to MSC 15 and the call completed to the called party. The seven digit identifying number of the calling party station is transmitted to the called destination for display as caller ID information. MSC 15 identifies the altered number as a fixed rate call and does not initiate air time rating.

If the calling party station is not a CPP billing subscriber, processing may continue in similar manner as described in copending application Ser. No. 09/467,145. Thus, at step S11 the retrieved subscriber record is examined to determine whether it contains a "VIP" list of telephone numbers of calling stations from which CPP treatment is not to be applied. If a VIP list has been identified it is compared with the telephone number of the calling party. A match of the numbers characterizes the call as being an exception to CPP service application. At step S12, the SCP (or LIDB) then formulates a TCAP call control type response message or equivalent, including the appropriate instructions for bypassing the Calling Party Pays processing system, and returns that response message to the tandem office via the SS7 network. The tandem switch will generate an IAM signaling message, at step S13, in order to complete the call as a normal mobile destination call, exempt from CPP status. That is, the called party is to be billed for air time charges. The calling party number field of the IAM message will include an altered version of the calling party number, in similar manner to the altered number described above for the fixed fee caller CPP subscriber. To enable the MSC to distinguish between the two different call treatments, mutually exclusive altered numbers are assigned to the respective alternatives. For example, each alternative can be assigned a different fictitious area code, or a different number of extra digits, etc. At step S14, the call is routed to the appropriate end MSC and to the destination mobile station for completion of the call, with accounting for called party air time being made as for a normal mobile call.

If there has been no match of the calling party number with a "VIP" number listed in the called party record at step S11, the record is searched for a stored PIN number that is indicative of CPP exception status at step S15. If no PIN is found, the call is not exempt from CPP treatment. Such treatment is described in detail in the above identified copending applications and is represented generally in the flow chart as step S16. If a PIN has been identified in the called party record in step S15, a TCAP call control type response message or equivalent is formulated with processing instructions and sent to the tandem via the SS7 network at step S17; interactive voice communication with the calling party is then undertaken, at step S18, to provide the caller opportunity to enter a valid PIN. The tandem will connect the call to an internal announcement platform (not separately shown), to provide an announcement describing the CPP service and an audible prompt. The platform preferably is capable of speech recognition so that the caller may respond by speech or DTMF input. Alternatively, the tandem could connect the call to an external platform, such as an intelligent peripheral, to provide the interactive session.

At step S19, the response of the caller is evaluated to determine whether a valid PIN has been submitted. A valid response is determined if matching digits (or alphanumeric characters) are spoken or entered as DTMF input. Other verbal response by the caller, or lack of any response during a set time-out period, is taken as a lack of a valid PIN entry. Of course, entry of an incorrect PIN can be taken immediately as a PIN entry failure or the caller may be given one or more additional opportunities to enter a correct PIN. If no valid PIN determination has been made at step S19, the call will be treated as a CPP call, as described above and the flow chart branches to step S16. If a valid PIN has been determined in step S19, bypass of the CPP processing system is in order and the flow chart branches to processing step S13 to complete the call as described above.

While the foregoing has described what are considered to be preferred embodiments of the invention, it is understood that various modifications may be made therein and that the invention may be implemented in various forms and embodiments, and that it may be applied in numerous applications, only some of which have been described herein. Those skilled in the art will recognize that the present invention admits of a number of modifications, within the spirit and scope of the inventive concepts. For example, other altered forms of calling numbers may be used or the landline subscriber may be given options of specifying a limited number of CPP telephone numbers to be covered for an adjusted fee. It is intended by the following claims to claim all such modifications and variations which fall within the true scope of the invention.

What is claimed is:

1. In a telephone communications network comprising subscriber stations connected to landline switching facilities of a public switched telephone network (PSTN), the PSTN linked to a mobile switching center (MSC), a method for processing a call placed from a subscriber station to a mobile station of a Calling Party Pays (CPP) service subscriber, said method comprising the steps of:

in response to placement of said call, accessing a call processing record (CPR) for the calling subscriber station in a remote PSTN database;

determining whether the CPR for the calling subscriber station indicates subscription to service billing coverage for outgoing CPP calls from the calling subscriber station;

in response to a CPP billing coverage subscription determination in said determining step, transmitting a signaling message to a mobile switching center (MSC) associated with the called mobile station, said message including the calling station telephone number in a first altered form; and routing the call through the MSC for completion to the called mobile station without accounting for air time charges.

2. In a telephone communications network comprising subscriber stations connected to landline switching facilities of a public switched telephone network (PSTN), the PSTN linked to a mobile switching center (MSC), a method for processing a call placed from a subscriber station to a mobile station of a Calling Party Pays (CPP) service subscriber, said method comprising the steps of:

in response to placement of said call, accessing a call processing record (CPR) for the calling subscriber station in a remote PSTN database;

determining whether said CPR indicates subscription to service billing coverage for outgoing CPP calls;

in response to a CPP billing coverage subscription determination in said determining step, transmitting a signaling message to a mobile switching center (MSC) associated with the called mobile station, said message including the calling station telephone number in a first altered form; and routing the call through the MSC for completion to the called mobile station without accounting for air time charges, wherein:

said PSTN comprises a voice network including a plurality of switching facilities interconnected by trunks for carrying voice communication and a data signaling network for transmitting control messages in data form;

said accessing step comprises routing the call to a switching facility and transmitting a query message therefrom to a switching control point (SCP) in the landline network;

said signaling message is an IAM message generated and transmitted by said switching facility; and the first altered form of the telephone number is the inclusion of a first prescribed change in an originating telephone number field of the IAM message.

3. A method as recited in claim 2, wherein the originating telephone number field of the IAM message comprises digit allocations in excess of ten digits assigned to area code and telephone number, and said first altered form of the telephone number comprises a number added to a first excess digit in the originating telephone number field.

4. A method as recited in claim 1, wherein said CPP billing coverage subscription is applicable to an unlimited number of calls to CPP destinations for a prescribed time period for a prescribed fixed charge.

5. A method as recited in claim 2, wherein in response to a determination that the calling station CPR does not indicate CPP billing coverage subscription, the steps comprising:

determining whether the call is an exception to CPP service status;

in response to a determination that the call is an exception to CPP service, transmitting a signaling message to said MSC, said message including the calling station telephone number in a second altered form;

detecting the second altered form of the calling station telephone number at the MSC; and completing the call to the called mobile station and billing the called party for air time charges.

6. A method as recited in claim 5, wherein said completing step comprises:

routing the call to the MSC; and establishing a wireless link to the called destination through an appropriate base station, the second altered form of the calling station telephone number being transmitted to the called mobile station for display.

7. A method as recited in claim 5, wherein the originating telephone number field of the IAM message comprises digit allocations in excess of ten digits assigned to area code and telephone number, and said first altered form of the telephone number comprises a prescribed number added to a first excess digit in the originating telephone number field.

8. A method as recited in claim 7, wherein the second altered form of the telephone number comprises a number added to a second excess digit in the originating telephone number field.

9. A method as recited in claim 5, wherein the second altered form of the telephone number comprises a second prescribed number added to said first excess digit.

10. A method as recited in claim 5, wherein:

the first altered form of the telephone number comprises a first prescribed number sequence substituted for the calling station telephone number area code in the originating telephone number field, and the second altered form of the telephone number comprises a second prescribed number sequence substituted for the calling station telephone number area code in the originating telephone number field.

11. A method for processing a telephone call placed from a subscriber station connected to a landline public switched telephone network (PSTN) to a mobile station for a subscriber of a wireless telephone network, said PSTN comprising a plurality of switching facilities interconnected by trunks for providing voice communication between subscriber stations connected to the switching facilities and a control system data network for controlling processing and routing of telephone calls, said wireless telephone network comprising at least one mobile switching center (MSC) interfaced with said PSTN and a plurality of base stations associated with respective mobile stations, said method comprising the steps of:

in response to initiation of said telephone call by said calling station, routing the call to a designated landline switching facility that interfaces with said MSC;

accessing a data base associated with said land line network to obtain a call processing record for the called mobile station to determine whether the called party subscribes to calling party pays (CPP) service;

if the called party is a CPP subscriber, as determined in said accessing step, accessing a landline database call processing record for the calling party to determine whether the calling party subscribes to service billing coverage for outgoing CPP calls;

if the calling party subscribes to the service billing coverage for outgoing CPP calls, routing the call to said MSC with a data message containing the telephone number of the calling station in altered form; and responsive to the altered form of the telephone number of the calling station, completing the call to the called mobile station without accounting for air time charges.

12. A method as recited in claim 11, wherein said accessing steps comprise transmitting a query message by said designated landline switching facility through said control system data network to a remote service control point (SCP) and said call processing records are retrieved from one or more databases comprising a line identification database (LIDB) and SCP associated database.

13. A method as recited in claim 11, wherein said CPP billing coverage subscription is applicable to an unlimited number of calls to CPP destinations for a prescribed time period for a prescribed fixed charge.

14. A method for processing a telephone call placed from a subscriber station connected to a landline public switched telephone network (PSTN) to a mobile station for a subscriber of a wireless telephone network, said PSTN comprising a plurality of switching facilities interconnected by trunks for providing voice communication between subscriber stations connected to the switching facilities and a control system data network for controlling processing and routing of telephone calls, said wireless telephone network comprising at least one mobile switching center (MSC) interfaced with said PSTN and a plurality of base stations associated with respective mobile stations, said method comprising the steps of:

in response to initiation of said telephone call by said calling station, routing the call to a designated landline switching facility that interfaces with said MSC;

accessing a data base associated with said land line network to obtain a call processing record for the called mobile station to determine whether the called party subscribes to calling party pays (CPP) service;

if the called party is a CPP subscriber, as determined in said accessing step, accessing a landline database call processing record for the calling party to determine whether the calling party subscribes to service billing coverage for outgoing CPP calls;

if the calling party subscribes to CPP billing coverage, routing the call to said MSC with a data message containing the telephone number of the calling station in altered form; and completing the call to the called mobile station without accounting for air time charges, wherein, if the calling party does not subscribe to CPP billing coverage, the method comprises the further steps of:

accessing the CPR of the called party to determine whether the call is exempt from CPP status;

if the call is exempt from CCP status, transmitting a signaling message from said designated landline switching facility to said (MSC), said signaling message including the calling station telephone number in altered form different from the form of the data message generated in a call placed by a CPP service billing coverage landline subscriber; and routing the call to completion through the MSC to the called mobile station and billing the called station subscriber for air time charges.

15. A method as recited in claim 14, wherein at least one of the routing steps comprises transmitting to the called mobile station the telephone number of the calling station in altered form for display at the called station.

16. A method as recited in claim 14, wherein, if the call is not exempt from CPP status, routing the call to the MSC with a signaling message including the calling station telephone number in unaltered form; and in response to detection by said MSC of the unaltered telephone number, completing the call to the called party and billing the calling party for air time charges for the called party.

17. A method as recited in claim 14, wherein CPP exempt status determination is made by comparing the telephone number of the calling station with the call processing record of the called party for a match to a telephone number listed therein, said match being indicative of an exception determination.

18. A method as recited in claim 14, wherein CPP exempt status determination is made by communicating with said calling station for receiving a PIN input therefrom; and comparing a PIN input received from said calling station for a match with a PIN contained in the call processing record of the called party, said match being indicative of an exception determination.

19. A method as recited in claim 11, wherein the step of completing comprises routing the call to the called destination through a mobile switching center that serves the area in which the called station is located; and if the location area is served by a mobile switching center other than said MSC, transmitting the altered calling station telephone number to the other mobile switching center.

20. In a telephone communications network comprising subscriber stations connected to landline switching facilities of a public switched telephone network (PSTN), the PSTN linked to a mobile switching center (MSC), a method for processing a call placed from a subscriber station to a mobile station of a Calling Party Pays (CPP) service subscriber, said method comprising the steps of:

in response to placement of said call, accessing a call processing record (CPR) for the calling subscriber station in a remote PSTN database;

determining whether said CPR indicates subscription to service billing coverage for outgoing CPP calls;

in response to a CPP billing coverage subscription determination in said determining step, transmitting a signaling message to a mobile switching center (MSC) associated with the called mobile station, said message including the calling station telephone number in a first altered form; and routing the call through the MSC for completion to the called mobile station without accounting for air time charges, wherein:

the first altered form of the telephone number comprises a first prescribed number sequence substituted for the calling station telephone number area code in the originating telephone number field, and a second altered form of the telephone number comprises a second prescribed number sequence substituted for the calling station telephone number area code in the originating telephone number field.

* * * * *